United States Patent
Sanftleben et al.

(10) Patent No.: US 6,999,301 B1
(45) Date of Patent: Feb. 14, 2006

(54) CAPACITIVE LOAD CELL APPARATUS HAVING AN ANNEALED SYNTHETIC WOVEN SPRING DIELECTRIC

(75) Inventors: Henry M. Sanftleben, Carmel, IN (US); William W. Fultz, Carmel, IN (US); Eric M Berg, Russiaville, IN (US); Morgan D. Murphy, Kokomo, IN (US); Dennis P. Griffin, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/053,522

(22) Filed: Feb. 8, 2005

(51) Int. Cl.
*H01G 4/20* (2006.01)

(52) U.S. Cl. .............. 361/312; 361/311; 361/313; 73/718; 340/438

(58) Field of Classification Search ........ 361/311–312, 361/306.3, 323–324, 328–329, 330; 73/718, 73/724, 862.046, 862.473; 340/438; 324/658

See application file for complete search history.

(56) References Cited

U.S. PATENT DOCUMENTS

| 4,266,263 A | | 5/1981 | Haberl et al. | |
|---|---|---|---|---|
| 4,836,033 A | | 6/1989 | Seitz | |
| 5,159,316 A | * | 10/1992 | Lazzara | 340/568.2 |
| 5,742,471 A | * | 4/1998 | Barbee et al. | 361/312 |
| 5,775,332 A | * | 7/1998 | Goldman | 600/587 |
| 5,878,620 A | | 3/1999 | Gilbert et al. | |
| 6,448,789 B1 | | 9/2002 | Kraetzl | |

* cited by examiner

*Primary Examiner*—Anthony Dinkins
(74) *Attorney, Agent, or Firm*—Scott A. McBain

(57) ABSTRACT

A capacitive load cell apparatus includes upper and lower capacitor plates and an intermediate dielectric in the form of a synthetic knit spacer material having upper and lower fabric layers interconnected by an array of deflectable synthetic fibers. When occupant weight is applied to the seat, the synthetic fibers deflect to locally reduce the separation between the upper and lower capacitor plates, and the consequent change in capacitance is detected as a measure of the applied weight. The load cell or just the dielectric may be encased in a polymeric sheath to prevent intrusion of foreign matter, and a fluid such as silicone may be dispersed in woven dielectric.

6 Claims, 1 Drawing Sheet

CAPACITIVE LOAD CELL APPARATUS HAVING AN ANNEALED SYNTHETIC WOVEN SPRING DIELECTRIC

TECHNICAL FIELD

The present invention relates to a capacitive load cell for estimating occupant weight applied to a vehicle seat, and more particularly to a load cell having an annealed synthetic woven spring dielectric.

BACKGROUND OF THE INVENTION

Various sensing technologies have been utilized to classify the occupant of a vehicle seat for purposes of determining whether to enable or disable air bag deployment, and/or for purposes of determining how forcefully an air bag should be deployed. The present invention is directed to an approach in which at least one capacitive load cell is installed in a vehicle seat, and the capacitance of the load cell is measured to provide an indication of the weight applied to the seat and/or the distribution of the applied weight. In general, a capacitive load cell includes at least first and second conductive plates separated by a compressible dielectric such as a sheet of rubber, plastic or polymeric foam. For example, representative capacitive load cells are disclosed in the U.S. Pat. No. 4,266,263 to Haberl et al., issued on May 5, 1981. Additionally, the U.S. Pat. No. 4,836,033 to Seitz; U.S. Pat. No. 5,878,620 to Gilbert et al.; U.S. Pat. No. 6,448,789 to Kraetzl; and U.S. Pat. No. 6,499,359 to Washeleski et al. show capacitive load cells as applied to vehicle seats for sensing occupant weight or weight distribution.

SUMMARY OF THE INVENTION

The present invention is directed to an improved capacitive load cell apparatus for measuring weight applied to a vehicle seat, including upper and lower capacitor plates and an intermediate dielectric comprising an annealed woven spring material having upper and lower fabric layers interconnected by an array of deflectable synthetic fibers. When occupant weight is applied to the seat, the synthetic fibers deflect to locally reduce the separation between the upper and lower capacitor plates, and the consequent change in capacitance is detected as a measure of the applied weight. The load cell or just the dielectric may be encased in a polymeric sheath to prevent intrusion of foreign matter, and a fluid such as silicone may be dispersed in woven dielectric.

DESCRIPTION OF THE PREFERRED EMBODIMENT

While the capacitive load cell apparatus of the present invention may be used in various applications, it is disclosed herein in the context of an apparatus for detecting the weight and/or distribution of weight applied to a vehicle seat. In general, a capacitive load cell comprises upper and lower conductor plates separated by a compressible non-conductive dielectric, such that mechanical loading of the cell compresses the dielectric, increasing the electrical capacitance between the upper and lower conductor plates. As applied to a vehicle seat, the capacitive load cell is preferably disposed between the frame and bottom cushion of the seat as depicted herein, but it will be understood that the load cell may be installed in a different location such as in the bottom cushion, in or behind a back cushion, and so on.

Figure 1:
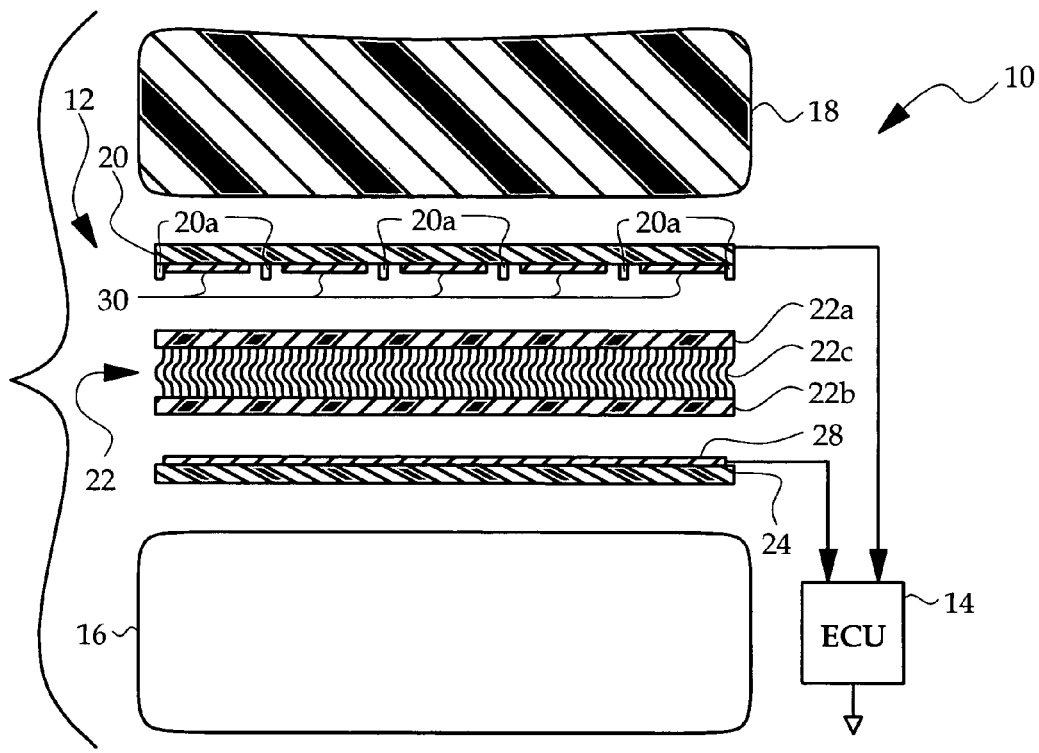
FIG. 1 is an exploded diagram of a vehicle seat and a sensing apparatus including a capacitive load cell having a woven spacer dielectric according to the present invention.

Referring to FIG. 1, the reference numeral 10 generally designates a seat bottom and sensor apparatus according to this invention. The sensor apparatus includes a capacitive load cell 12 and an electronic control unit (ECU) 14. The load cell 12 is disposed between the seat frame 16 and a foam cushion 18, and includes an upper substrate 20, a dielectric 22, and a lower substrate 24. A reference plane conductor 28 is formed on lower substrate 24 adjacent the lower surface of dielectric 22, and a number of charge plate conductors 30 are formed on upper substrate 20 adjacent the upper surface of dielectric 22. The upper and lower substrates 20, 24 are non-conductive, and may be formed of a material such as polyurethane with a thickness of about 0.5 mm, for example. The conductors 28, 30 may be metal foil pads laminated to the respective substrates 24, 20. The reference plane conductor 28 and each of the charge plate conductors 30 are separately coupled to ECU 14, which periodically measures capacitance values between the reference plane conductor 28 and each of the charge plate conductors 30. The measured capacitances provide an indication of the weight applied to seat cushion 18, as well as the distribution of the weight, for purposes of detecting the presence of an occupant and classifying the occupant as a child, an adult, a child seat, or some other classification.

According to the present invention, the dielectric 22 is an annealed synthetic knit spacer fabric comprising upper and lower fabric layers 22a, 22b separated by an array of deflectable synthetic fibers 22c. Suitable fabrics may be obtained, for example, from Gehring Textiles, Inc., Garden City, N.Y., under the trade name $D^3$. In a vehicle seat application as illustrated in FIG. 1, the dielectric will preferably have an uncompressed thickness of about 0.315 inch, and an inter-fabric fiber density that provides a deflection characteristic of about 0.10 inch/psi of applied load. As occupant weight is applied to the cushion 18, fibers 22c deflect in proportion to the applied weight, reducing the separation between the reference plane conductor 28 and respective charge plate conductors 30. The reduced separation increases the capacitance between the reference plane conductor 28 and respective charge plate conductors 30, and ECU 14 measures the capacitance as an indication of the magnitude and distribution of the applied weight. In the illustrated embodiment, an array of posts 20a formed on the inboard face of upper substrate 20 limit the deflection of dielectric 22 to about 0.20 inch, corresponding to an applied load of about 2.0 psi. Alternately, an array of posts may be formed on inboard face of lower substrate 24.

Figure 2:
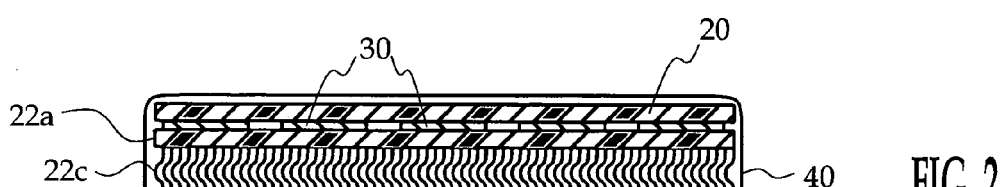
FIG. 2 is a first alternative embodiment in which the load cell of FIG. 1 is encased in a polymeric sheath.
Figure 3:
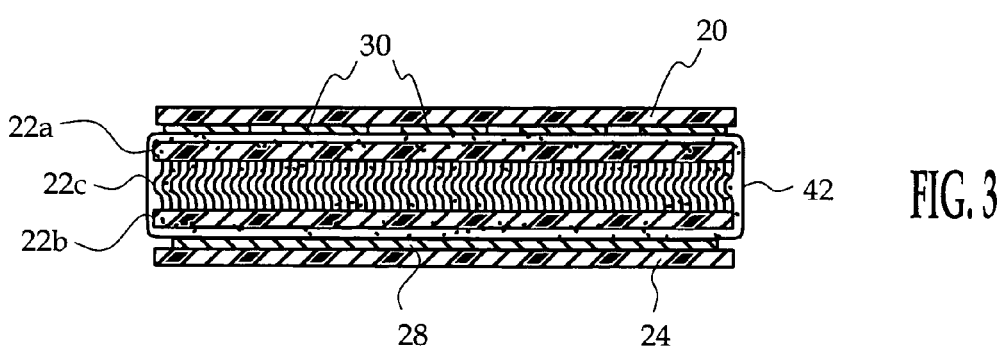
FIG. 3 is a second alternative embodiment in which the load cell dielectric of FIG. 1 is encased in a urethane bladder at least partially filled with a fluid such as silicone.

FIG. 2 depicts an embodiment in which the load cell 12 is encased in a sealed polymeric bag or bladder 40 to prevent the dielectric 22 from intrusion of liquid, dust, seat foam particles or other foreign matter that could affect its dielectric constant. Alternatively, a polymeric bladder 42 may be placed over just the dielectric 22, as depicted in FIG. 3. In this case, the bladder 42 may be filled with a fluid such as silicone that is not subject to freezing at cold ambient temperatures. The combination of the encased fluid and woven dielectric improves the overall linearity of the sensor, and the woven dielectric enhances restoration of the bladder 40 following removal of an occupant load.

Significantly, the knit spacer dielectric 22 is annealed prior to assembly into the load cell 12 to relieve residual manufacturing-related stresses in the material. This measurably improves the reliability and repeatability of capacitive load cells according to this invention. The dielectric may be annealed simply by heating it to a prescribed annealing temperature such as 100° C. for a prescribed time such as 30 seconds, and then allowing it to cool to ambient temperature.

While the present invention has been described with respect to the illustrated embodiment, it is recognized that numerous modifications and variations in addition to those mentioned herein will occur to those skilled in the art. Accordingly, it is intended that the invention not be limited to the disclosed embodiment, but that it have the full scope permitted by the language of the following claims.

What is claimed is:

1. Capacitive load cell apparatus including first and second conductor plates separated by a compressible dielectric such that force applied to the load cell compresses the dielectric to increase a capacitance between the first and second conductor plates, the improvement wherein:
   the compressible dielectric comprises an annealed synthetic knit spacer material including upper and lower fabric layers interconnected by an array of synthetic fibers that deflect in response to said applied force to produce an increase in capacitance between the first and second conductor plates that is indicative of said applied force.

2. The capacitive load cell apparatus of claim 1, wherein said first conductor plate is supported on a substrate, and said substrate includes an array of posts that extend from said substrate toward said second conductor plate to limit deflection of said synthetic fibers in response to said applied load.

3. The capacitive load cell apparatus of claim 1, wherein said annealed synthetic knit spacer material has a deflection characteristic of about 0.10 inch/psi of applied force.

4. The capacitive load cell apparatus of claim 1, further comprising a bladder enclosing said annealed synthetic knit spacer material to prevent intrusion of foreign matter that could alter a dielectric constant of said annealed synthetic knit spacer material.

5. The capacitive load cell apparatus of claim 4, wherein said bladder also encloses said first and second conductor plates.

6. The apparatus of claim 1, further comprising:
   a bladder enclosing said annealed synthetic knit spacer material, said bladder additionally being filled with a dielectric fluid.

* * * * *